United States Patent [19]
Brewer

[11] Patent Number: 5,355,811
[45] Date of Patent: Oct. 18, 1994

[54] ADJUSTABLE LEG SUPPORTED MOUSE PAD

[76] Inventor: Brian H. Brewer, 2005-185th Place SE. #P-204, Bothell, Wash. 98012

[21] Appl. No.: 40,918

[22] Filed: Mar. 31, 1993

[51] Int. Cl.⁵ .......................................... A47B 23/00
[52] U.S. Cl. ...................................................... 108/43
[58] Field of Search ................. 108/43, 45, 42, 130; 248/444

[56] References Cited

U.S. PATENT DOCUMENTS

| | | | |
|---|---|---|---|
| 2,420,673 | 5/1947 | Monrad | 108/43 X |
| 2,553,676 | 5/1951 | Roos | 108/43 X |
| 2,670,260 | 2/1954 | Watt | 108/43 X |
| 3,215,453 | 11/1965 | Macom, Jr. | 108/43 X |
| 3,991,966 | 11/1976 | Broon, II | 108/43 X |
| 5,016,,147 | 5/1991 | Voorhees | 108/43 X |
| 5,263,423 | 11/1993 | Anderson | 108/43 |

*Primary Examiner*—Jose V. Chen
*Attorney, Agent, or Firm*—Craine & Jackson

[57] ABSTRACT

The adjustable leg supported mouse pad designed to enable a user to use a mouse input device directly over his or her upper leg or thigh while sitting. The leg supported mouse pad includes a saddle structure capable of engaging the user's thigh and horizontally aligning a planar mouse pad attached thereto over the user's thigh. The saddle structure includes a rectangular shaped flexible panel with two five-sided support members attached to the top surface thereon on opposite sides of the flexible panel's transverse axis. When the flexible panel is disposed transversely over the user's upper leg while sitting, the support members are repositioned so that their medial planar surfaces are oriented in a substantially horizontal position. The support members are spaced apart on the flexible panel so that a mouse pad maybe supported on two support member's medial planar surfaces. In one embodiment, at least one of the support members is adjustably attached to the flexible panel which enables the device to be adjusted for use on different leg sizes. Also, the mouse pad may have an optional, raised edge designed to prevent a mouse placed thereon from sliding off.

5 Claims, 4 Drawing Sheets

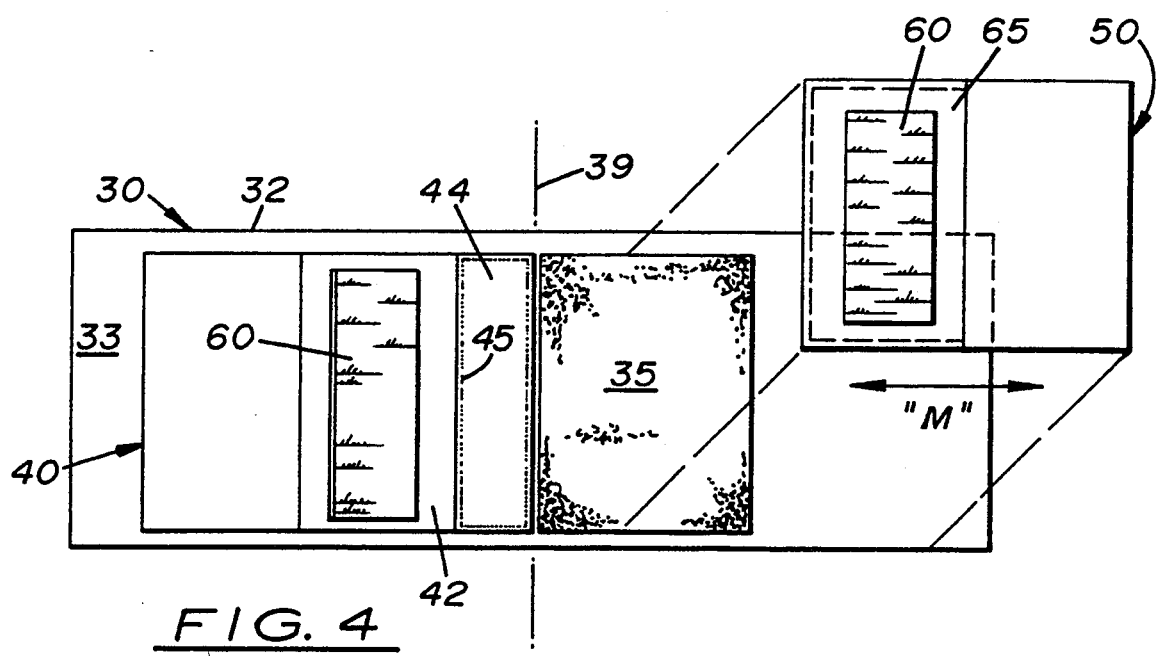
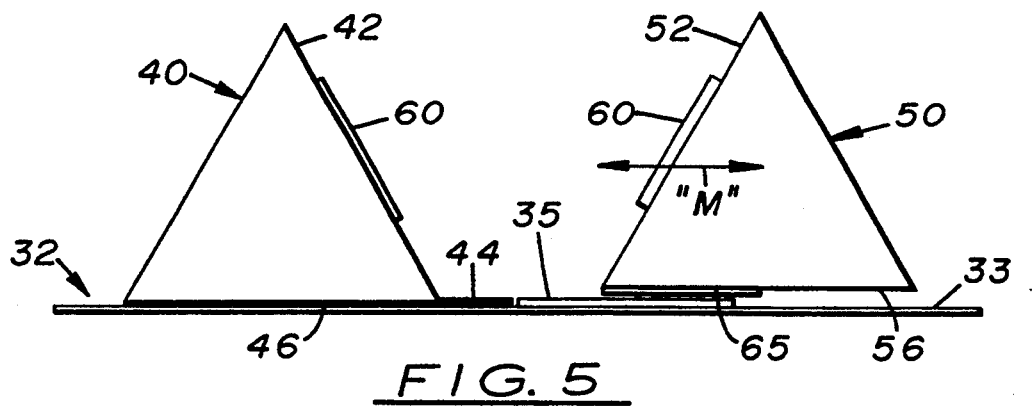
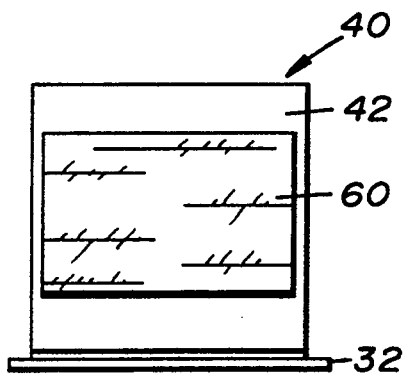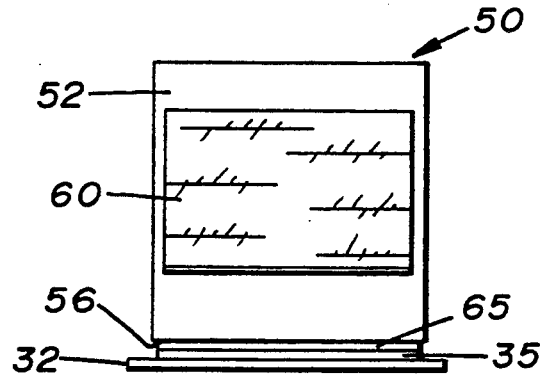

ADJUSTABLE LEG SUPPORTED MOUSE PAD

BACKGROUND OF THE INVENTION

1. Field of the Invention

This invention relates to mouse pads and more particularly to mouse pads capable of being supported on a user's leg when seating.

2. Description of the Related Art

Keyboards and mouse input devices are the two most common devices used to input information into a computer. Today, many software programs are designed to operated exclusively with either a keyboard or a mouse input device, hereinafter called a mouse. Many other software programs are designed to operate with both devices which allows the user to alternate between them to carry out different operations in the program.

The mouse is a common pointing device which includes a small box-shaped casing with a flat bottom, designed to be gripped by one hand. The casing has one or more buttons on the top, a multidirectional detecting component (usually a ball) on the bottom, and a cable connecting the mouse to the computer. When the mouse is moved over the flat surface, it generates signals which control the position of a cursor or pointer on a graphical user interface shown on the computer display.

Although a mouse can be operated on any flat surface, it is commonly used on a mouse pad. The mouse pad is a flat pad-like structure made of foam or latex material having approximately the same dimensions as the computer display. The top surface of the mouse pad is textured so that the multidirectional detecting component is moved when the mouse is moved across the mouse pad.

Ideally, the mouse pad should be placed in a location on the desk top directly in front of the computer display. Since the keyboard usually occupies this location, the mouse pad is usually placed in a location adjacent to the keyboard. Unfortunately, such a location is not well suited for optimal control of the mouse and for user comfort.

A mouse pad which may be used at an alternative location which allows the user to maintain optimal control on the mouse and comfort, would be highly desirable.

SUMMARY OF THE INVENTION

It is an object of the present invention to provide a device capable of supporting a mouse pad on a user's leg while sitting.

It is another object to provide such a device which sufficiently engages the user's leg to prevent disengagement during normal use.

It is further object to provide such a device which is adjustable for use by individuals having different leg sizes.

The present invention achieves these and many other objects which will become apparent herein by providing an adjustable leg supported mouse pad which enables a user to use a mouse directly in front of the computer display while seating.

The leg supported mouse pad comprises a planar mouse supporting surface attached to a leg engaging means. The leg engaging means is designed to sufficiently engage the user's upper leg while in a sitting position so that the device is not disengaged during normal use. The leg engaging means is also designed to be selectively attach and support the mouse supporting surface in a substantially horizontal position over the user's upper leg during use.

In the preferred embodiment, the mouse supporting surface is a mouse pad similar in shape to a typical mouse pad used today. The leg engaging means is a saddle structure which comprises a flexible panel with two support members attached to the top surface thereof. In preferred embodiment, each support member is a five-sided shape having a triangular cross-section and a quadrilateral base. Each support member acts as a pillow structure manufactured to be sufficiently firm so that it may be manipulated into a desired shape to support a mouse pad attached thereto.

The support members are spaced apart and attached to the top surface of the flexible panel on opposite sides of the flexible panel's transverse axis. When the flexible panel is disposed horizontally, the medial planar surfaces on the support members are angled downward and converge towards the flexible panel's transverse axis. When the flexible panel is placed over the user's thigh, the flexible panel bends and conforms to the upper surface of the leg and the support members are reoriented so that their medial planar surfaces are disposed horizontally. When disposed horizontally in this manner, each medial planar surface are able to support approximately one-half of a mouse pad placed thereon. A fastening means is disposed between the medial planar surface on each support member and the bottom surface of the mouse pad which allows the user to selectively fasten the mouse pad to the support member. In the preferred embodiment, one support member is adjustably attached to the flexible panel which enables the user to adjust its relative position on the flexible panel. This feature enables the saddle structure to be adjusted for use by users having different leg sizes and with different size mouse pads.

Another advantage of the invention, is the foregoing leg supported mouse pad can be used on either leg.

BRIEF DESCRIPTION OF THE DRAWINGS

FIG. 4 is a top plan view of the leg saddle structure, FIG. 5 is a side elevation view of the leg saddle structure shown in FIG. 4, FIG. 6 is a side elevation view of the first support member attached to the flexible panel.

FIG. 7 is a side elevation view of the second support member attached to the flexible panel.

DESCRIPTION OF THE PREFERRED EMBODIMENT(S)

The present invention will be described in relation to one preferred embodiment. It is to be understood, that various modifications, changes, substitutions of equivalents and other alterations can be made without departing from the inventive concept. It is intended that the present invention shall be limited only by the appended claims. Like numbers will be used to drawings and in the ensuing material to indicating the same or similar portions of the invention.

Figure 1:
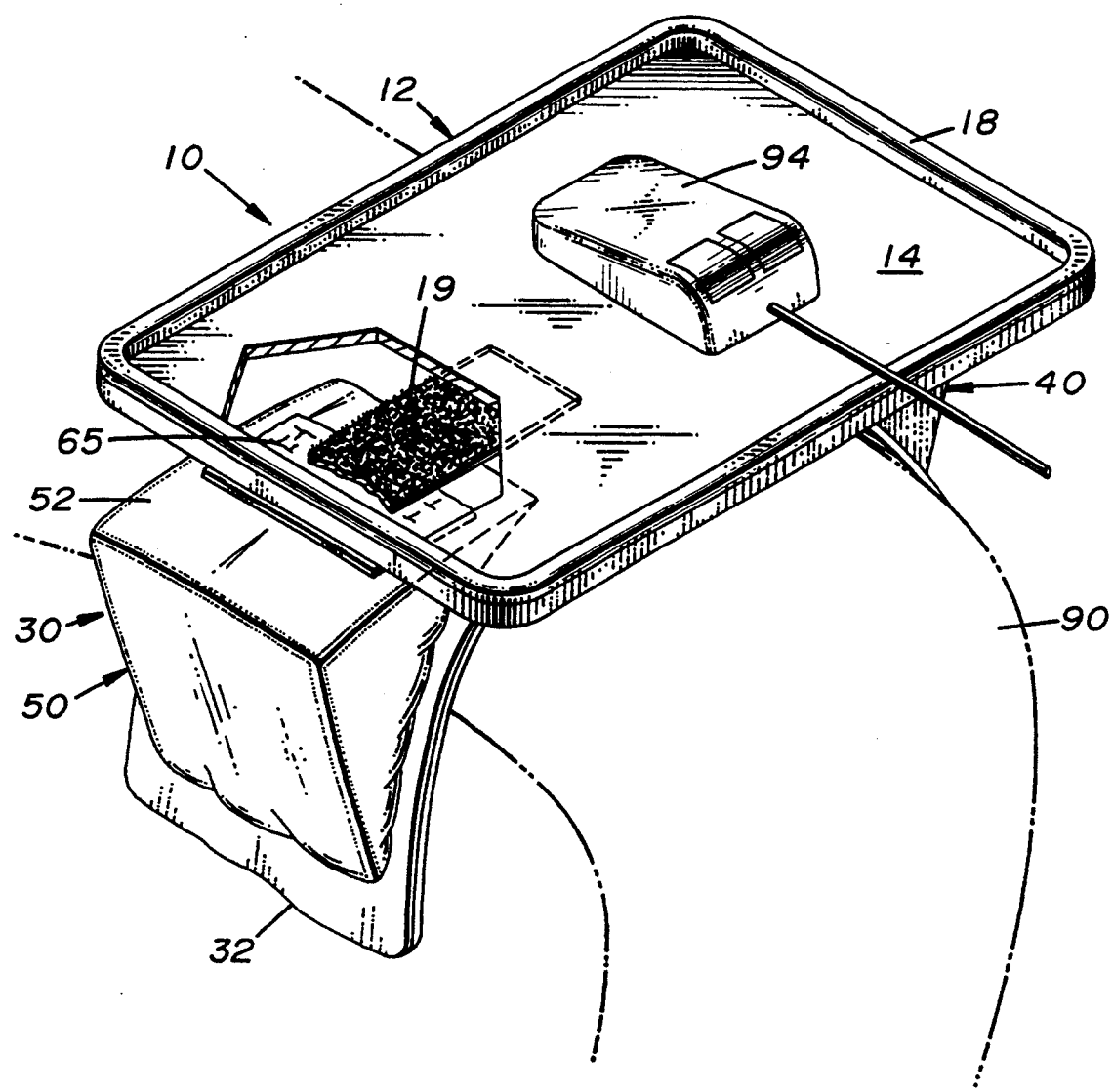
FIG. 1 is a perspective vie of the leg supported mouse pad disclosed herein.
Figure 2:
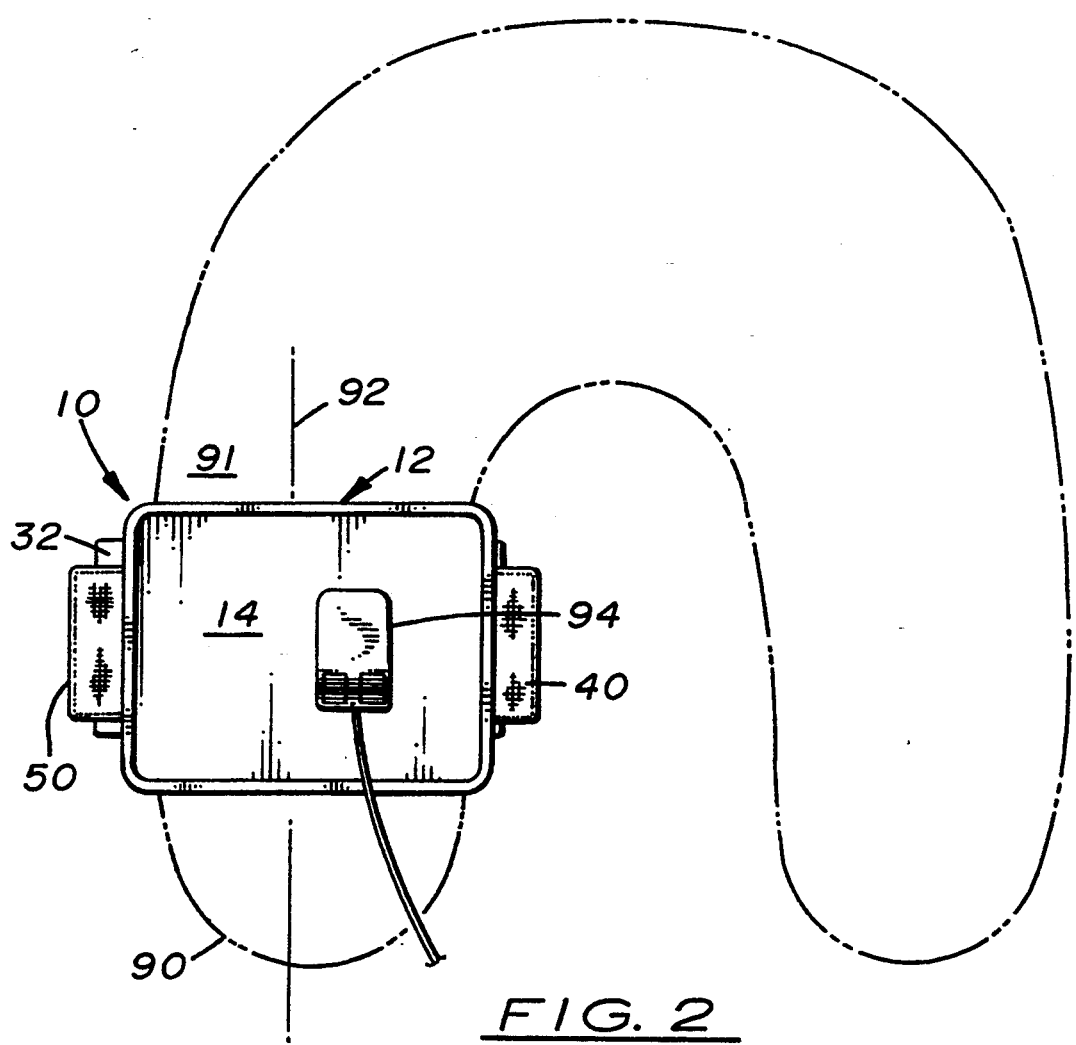
FIG. 2 is a top plan view of the leg supported mouse pad aligned over a user's leg.
Figure 3:
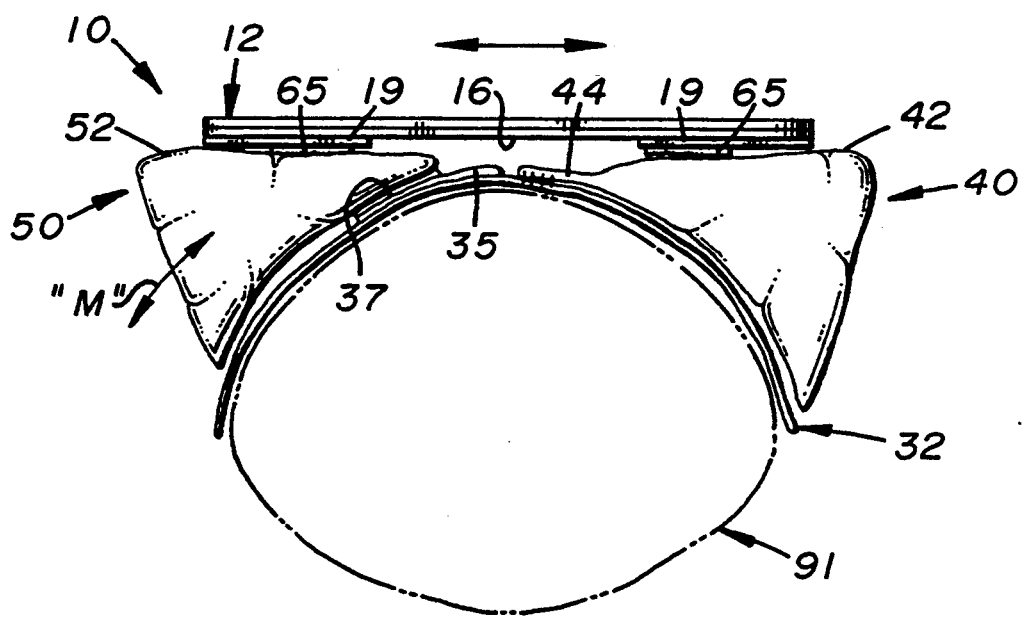
FIG. 3 is a front elevational view of the leg supported mouse pad aligned over the user's leg.
Figure 8:
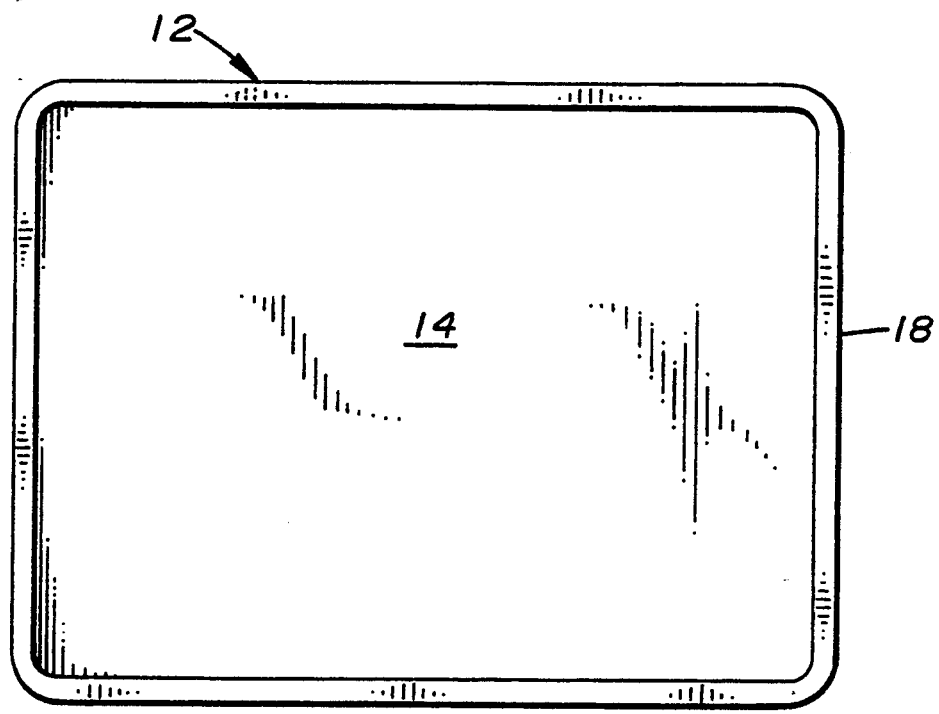
FIG. 8 is a top plan view of the mouse pad.

As can be seen in FIGS. 1–3, the adjustable leg supported mouse-pad, generally designed as 10, is comprised of a mouse support surface or mouse pad 12 and a leg engaging means capable to engaging the user's upper leg while sitting. In the preferred embodiment, the leg engaging means comprises an adjustable saddle structure 30 that includes a flexible panel 32 and first and second support members 40, 50, respectively, spaced apart and attached to the top surface 33 thereof.

The first and second support members 40, 50, respectively, are disposed on the top surface 33 of flexible panel 32 on opposite sides of the flexible panel's transverse axis 39. During use, the flexible panel 32 is placed over the user's thigh 91 with the first support member 40 being disposed over the medial aspect of the user's thigh 91 and the second support member 50 being disposed over the lateral aspect of the user's thigh 91. When the flexible panel 32 is disposed over the user's thigh 91, the medial planar surfaces 42, 52 on the support members 40, 50, respectively, are realigned into a substantially horizontal position as shown in FIGS. 1 and 3. When aligned in this horizontal position, the medial planar surfaces 42, 52, are, in combination, able to support a mouse pad 12 placed thereon.

The flexible panel 32 acts as a base member which holds each support member 40, 50 in position over the user's thigh 91. As more clearly shown in FIGS. 4 and 5, the flexible panel 32 is of rectangular configuration approximately 16 inches in length and 6 inches in width. The flexible panel 32 is made of a single sheet of flexible fabric or nylon material or two sheets of fabric or nylon material sewn or glued together along their outer edges. When the saddle structure 30 is placed over the user's thigh, the flexible panel 32 must be sufficiently flexible to bend and conform to the top surface 33 thereof. It should be understood, however, that the flexible panel 32 may be manufactured in different configurations and sizes for special applications.

Each support member 40, 50 acts as a pillow structure capable of supporting approximately one-half of a mouse pad 12 placed thereon. Each support member 40, 50 is sufficiently formable so that it may be adjusted in shape to align and support a mouse pad 12 in a substantially horizontally over the user's thigh 91 during use. In addition, each support member 40, 50 acts as weight which holds the flexible panel 32 in place on the user's thigh 91.

In the preferred embodiment, each support member 40, 50 is a five-sided shape with a triangular cross-section and a quadrilateral, planar bottom surface 46, 56, respectively. Each support member 40, 50 has a medial planar surface 42, 52, respectively, a lateral diagonal surface, 43, 53, respectively, a bottom planar surface 46, 56, respectively, an inside end planar surface 47, 57, respectively, and an outside end planar surface 48, 58, respectively. Each support member 40, 50 is made of cotton or nylon material with is filled with a sufficient amount of cotton or other suitable fill material to form a firm, yet formable, pillow-like structure. In the preferred embodiment, the medial planar surfaces 42, 52, the lateral planar surfaces, 43, 53, and the bottom planar surfaces 46, 56, are joined along their respective adjoining edges to form an equilateral triangle in cross-section. In the embodiment shown which is designed to be used with a mouse pad 12 measuring approximately 11×9 inches, each planar surface of the support member 40, 50 measures approximately 5 ×5 inches.

Since both support members 40, 50 are pillow-like structures, they may be slightly adjusted in shape and orientation when attached to the flexible panel 32. For example as shown in FIG. 3, the bottom surface 46, 56, of each support member 40, 50, respectively, is shaped concavely to conform to the top surface 33 of the flexible panel 30 when positioned over the user's thigh 91. This feature, gives the saddle structure 30 a better leg engaging quality.

Although in the preferred embodiment the first support member 40 is fixedly attached and the second support member 50 is adjustably attached to the flexible panel 32, it should be understood that both support members 40, 50 may be fixedly attached or adjustably attached to the flexible panel 32. As mentioned above, both support members 40, 50 are attached at locations on the flexible panel 32 so that the mouse pad 12 is supported thereon when the flexible panel 32 is positioned over the user's thigh 91. In the preferred embodiment, the first support member 40 is fixedly attached to the flexible panel 32. Extending outward from the inside edge 45 located between the medial planar surface 42 and the planar bottom surface 46 on the first support member 40 is a rectangular-shaped flexible attachment flap 44. During manufacturing, the first support member 40 is aligned on the flexible panel 32 with the extending edge of the attachment flap 44 aligned and registered with the transverse axis 39. The attachment flap 44 is then sewn or adhesively attached to the top surface 33 of the flexible panel 32 to fixedly attached the first support member 40 to the flexible panel 32. By attaching the first support member 40 to the flexible panel 32 in this manner, the first support member 40 can be easily aligned on the user' thigh 91 by laterally adjusting the position of the flexible panel 32 over the thigh 91. By pivotally attaching the first support member 40 to the flexible panel 32 along the inside edge 45, the bottom surface 46 of the first support member 40 is able freely conform the to the curved top surface 33 of the flexible panel 42.

In the preferred embodiment, the second support member 50 is adjustably attached to the top surface 33 of the flexible panel 32 using an adjustable attachment means. The adjustable attachment means comprises a pair of loop and hook connectors disposed between the top surface 33 of the flexible panel 32 and the bottom surface 56 of the second support member 50. In one embodiment, a pad 35 loop connector material is shown sewn or glued to the top surface 33 adjacent to the transverse axis 39. Attached to the bottom surface 56 of the second support member 50 is a pad 37 made of complimentary hook connector material.

To attach the second support member 50 to the flexible panel 32, only a portion, approximately 1 inch, of pad 35 and pad 37 must interconnected. Pad 35, which measures approximately 3×4 inches (L×W), and pad 37, which measures approximately 2×4 inches (L×W), both must be sufficiently large so that the position of the second support member 50 on the flexible panel may be adjusted for different leg sizes.

The adjustability feature of the second support member 50 is illustrated in FIGS. 3 and 4 which shows the second support member 50 being moved along direction "M" 1–3 inches parallel to the flexible panel's longitudinal axis. By moving the support member 50 in this manner, the user is able to adjust the elevation of the second support member's medial planar surface 52 so that an attaching mouse pad 12 may be horizontally aligned. In addition to enabling the user to adjust the elevation of the support member, the adjustability feature also the user to adjust the spacing between the two first and second support members 40, 50, respectively. The amount of spacing required between the two support members 40, 50 is dependent upon the rigidity of the mouse pad 12. In the preferred embodiment, the mouse pad 12 is made of plastic or reinforced foam material which is more rigid than typical mouse pads made of foam material.

Figure 9:
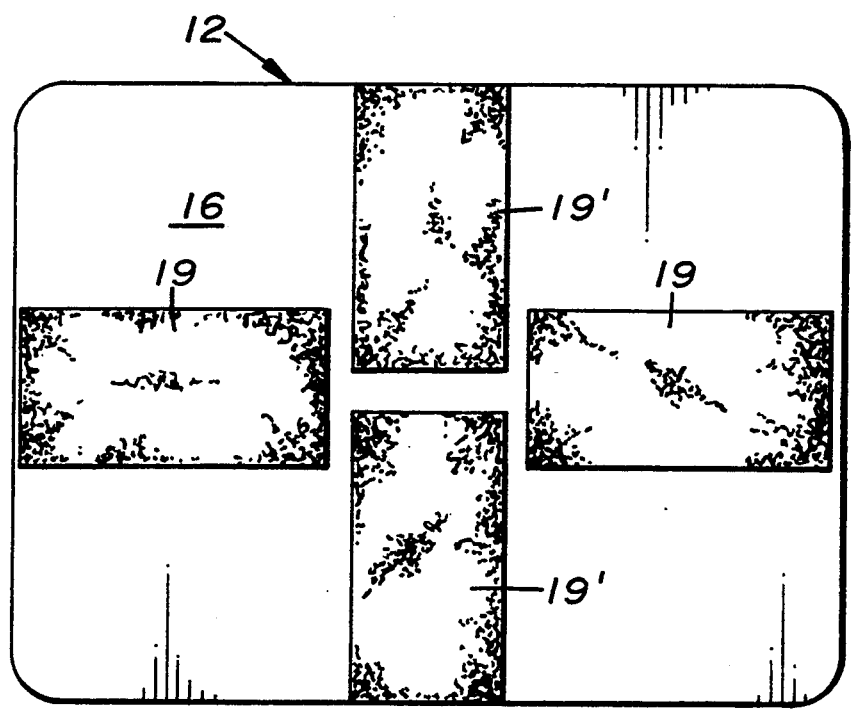
FIG. 9 is a bottom plan view of the mouse pad shown in FIG. 8.

To fasten the mouse pad 12 to the support members 40, 50, a fastening means is disposed between the medial planar surfaces 42, 52 located on the support members 40, 50, respectively, and the bottom surface 16 of the mouse pad 12. In the preferred embodiment, the fastening means comprise a two pairs of hook and loop connectors disposed between the adjoining surfaces. In the preferred embodiment, a rectangular or square-shaped pad 65 made of hook connector material is attached to the medial planar surfaces 42, 52, of support members 40, 50, respectively, and a pair of rectangular or square-shaped pads 19 made of loop connector material is attached to the bottom surface 16 of the mouse pad 12. As shown in FIG. 9, pads 19 are aligned longitudinally on the bottom surface 16 near the opposite ends of the mouse pad 12 so that the longitudinal axis of the mouse pad 12 maybe aligned transversely over the user's thigh during use. It should be understood that the pads (indicated 19') may be aligned transversely on the bottom surface 16 adjacent to the front and rear sides of the mouse pad 12 so that the longitudinal axis of the mouse pad 12 may be aligned longitudinally over the user's thigh during use.

To prevent the mouse 94 from falling off the mouse pad 12 during use, an optional peripheral raised edge 18 is manufactured on the top surface 14 of the mouse pad 12. Since the saddle structure 30 is designed to engage the user's leg, the user may keep the leg support mouse pad 10 in place while performing other functions, such as typing or writing.

It should also be understood that the saddle structure 30 may be placed on either the right or left leg and that the first or second support member 40, 50 may be disposed on the lateral or medial aspect of the user's thigh 91.

To use the leg supported mouse pad 10, the saddle structure 30 is positioned transversely over the user's thigh so that the first support member 40 is placed over the medial aspect of thigh. The position of the flexible panel 30 on the user's thigh is adjusted so that the flexible panel's transverse axis 39 is substantially aligned with the leg's longitudinal axis 92. After the flexible panel 32 has been properly aligned, the user then presses the first support member 40 downward so that its planar bottom surface 46 conforms with the top surface 33 of the flexible panel 32. The user then readjust the flexible panel and the shape of the first support member 40 so that its medial planar surface 42 is aligned in a substantially horizontal position.

Next, the second support member 50 is aligned over the lateral aspect of the user's thigh and attached to the flexible panel 32. The position of the second support member 50 on the flexible panel 32 is adjusted so that the opposite ends of the mouse pad 12 are sufficiently supported by the first and second support members 40, 50. After determining its correct attachment site, the second support member 50 is attached to the flexible panel 32 by interconnecting the pad 37 loop connector 37 located on the top surface 33 of the flexible panel 32 with the pad hook connector 67 located on the bottom surface 56 of the second support member 50.

After the saddle structure 30 has been properly positioned on the user's thigh 91, the mouse pad 12 is then fastened to the saddle structure 30 by interconnecting the pads 19 of hook connector located on the bottom surface 16 of the mouse pad 12 with the pad 65 of complimentary loop connector material located on the medial planar surfaces 42 and 52 on the support members 40, 50, respectively. After the lap supported mouse pad has been properly engaged on the user's leg 90, the user is then able to use a mouse 94 on the mouse pad 12.

In compliance with the statute, the invention has been described in language more or less specific as to structural features. It should be understood, however, that the invention is not limited to the specific features shown since the means and construction shown comprises the preferred forms of putting the invention into effect. The invention is, therefore, claimed in any of its forms or modifications within the legitimate and valid scope of the amended claims, appropriately interpreted in accordance with the doctrine of equivalents.

I claim:

1. An adjustable leg supported mouse pad, comprising:
   a. a mouse pad, said mouse pad having a flat top surface and a bottom surface;
   b. an adjustable saddle structure capable of engaging a user's thigh, said saddle structure including a flexible panel and a first support member and a second support member, said flexible panel having a top surface and a transverse axis, said first and second support members being spaced apart with said first support member being pivotally attached and said second support member being adjustably attached to said top surface of said flexible panel on opposite sides of said transverse axis, each said support member being a five-sided pillow shaped, triangular in cross-section, with a medial planar surface and a quadrilateral bottom surface;
   c. a fastening means disposed between said medial planar surfaces on said first and second support members and said bottom surface of said mouse pad enabling said first and second support members to be selectively fastened to said bottom surface of mouse pad, and;
   d. an adjustable attachment means disposed between said bottom surface of said second support member and said top surface of said flexible panel, said adjustable attachment means enabling said second support member to be adjustably attached to said flexible panel so that when said flexible panel is positioned transversely over said user's thigh, said second support member may be adjusted in position on said flexible panel so that when said mouse pad attached to said first and second support members, said mouse pad may be supported in a substantially horizontal position by said over said user's thigh.

2. An adjustable leg supported mouse pad, as recited in claim 1, further including said mouse pad having a peripheral raised edge on said top surface to prevent a mouse from falling off said top surface of said mouse pad.

3. An adjustable leg supported mouse pad, as recited in claim 2, wherein said mouse pad is made of relatively rigid material or reinforced foam material, said material being sufficiently rigid to prevent undesirable bending of said mouse pad during use.

4. An adjustable leg supported mouse pad, as recited in claim 3, wherein said fastening means comprises at least one pair of complimentary hook and loop connectors attached between the adjoining surfaces of said mouse pad and said support members.

5. An adjustable leg supported mouse pad as recited in claim 4, wherein said adjustment means comprises at least one pair of complimentary hook and loop connectors attached between the adjoining surfaces of said second support member and said top surface of said flexible panel.

* * * * *